March 6, 1928.

W. F. GROENE

SPINDLE STOP

Filed March 23, 1923

Inventor
WILLIAM F. GROENE
By Walter F. Murray
Attorney

March 6, 1928.

W. F. GROENE

SPINDLE STOP

Filed March 23, 1923

Inventor
WILLIAM F. GROENE

By *Walter A. Murray* Attorney

March 6, 1928.

W. F. GROENE

SPINDLE STOP

Filed March 23, 1923

Inventor
WILLIAM F. GROENE
By Walter F. Murray
Attorney

Patented Mar. 6, 1928.

1,661,474

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

SPINDLE STOP.

Application filed March 23, 1923. Serial No. 627,175.

An object of my invention is to provide means that may be used with machine tools such as lathes for automatically stopping of spindles of such tools.

Another object of my invention is to provide a device for the purpose stated wherein the spindle may be automatically stopped after a predeterminable number of revolutions or a part of a revolution, whereby to insure the spindle stopping at the same position after each operation.

Another object is to provide a device wherein the spindle stop may be put into action by the tripping of the feed mechanism whereupon the spindle can idle after the cutting tool has stopped, for cleaning up burrs, spring, or the like in the work.

Another object of my invention is to provide a simple and efficient device for the purposes stated.

Another object of my invention is to provide a device having a minimum of parts and wherein the action of the several parts in relation to one another is positive.

These and other objects are attained by the means described herein and disclosed in the accompanying drawings, in which.

The spindle 8 of a lathe is driven from the pulley 9 through a clutch mechanism 10 of any suitable kind, for example, as disclosed in my Patent No. 1,474,112.

Figure 1:
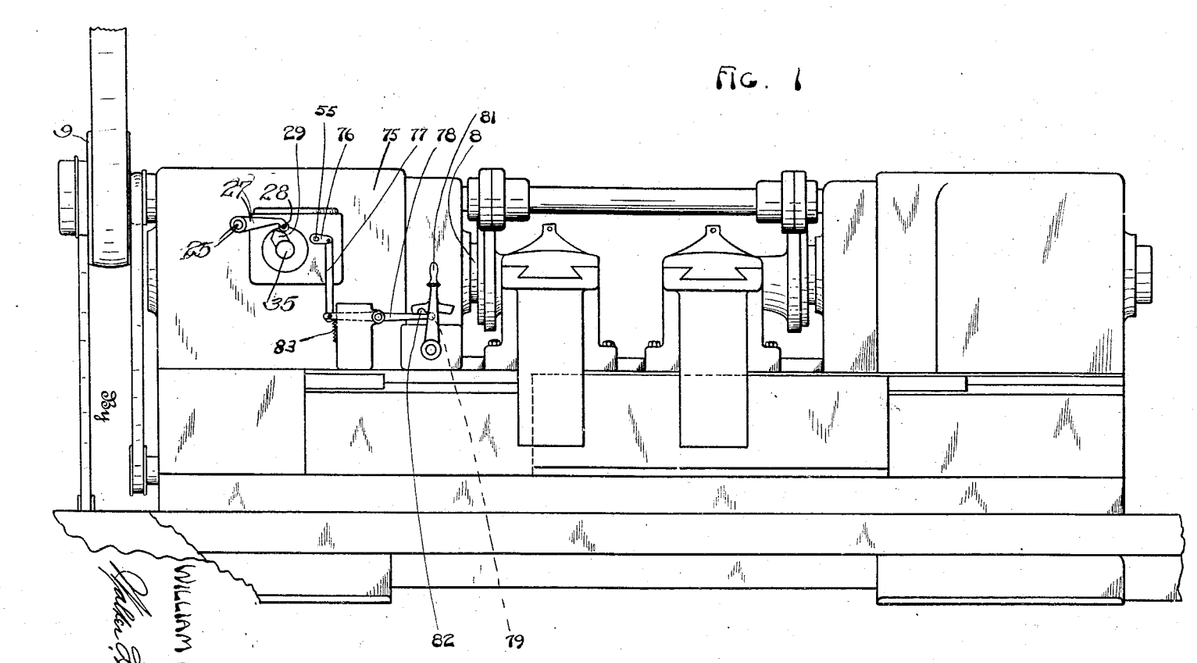
Fig. 1 is the front elevation of a lathe to which my invention has been applied.
Figures 2, 8:
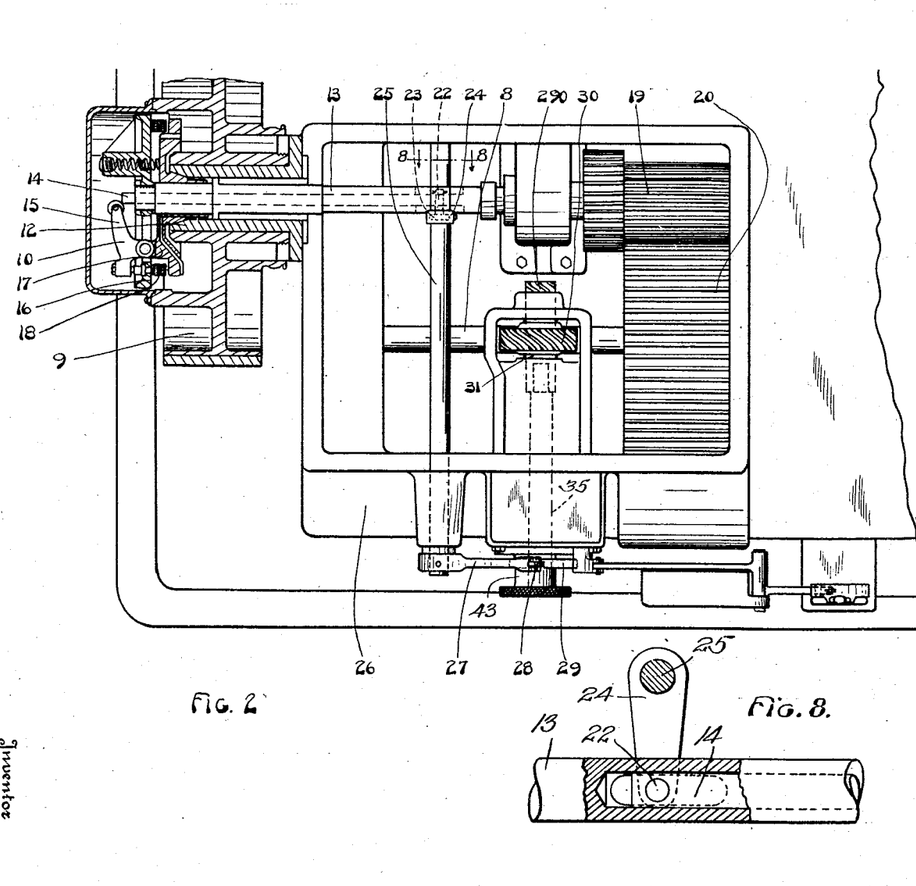
Fig. 2 is a fragmental plan view of a part of the device shown in Fig. 1, and embodying my invention.
Fig. 8 is an enlarged sectional view taken on line 8—8 of Fig. 2.
Figure 3:
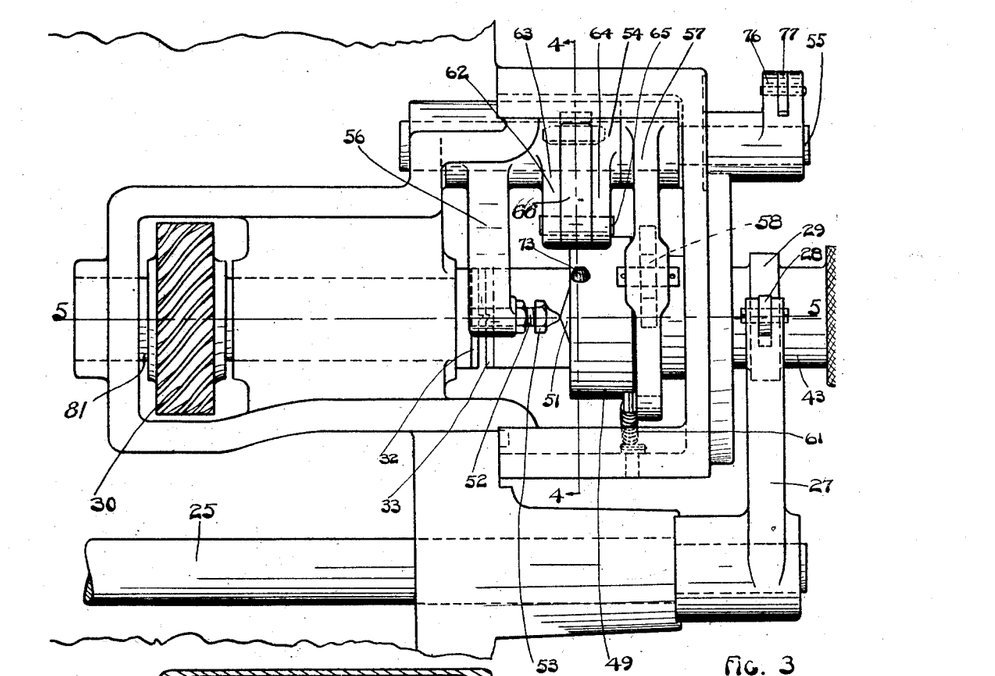
Fig. 3 is an enlarged plan view of parts shown in Fig. 2.
Figure 5:
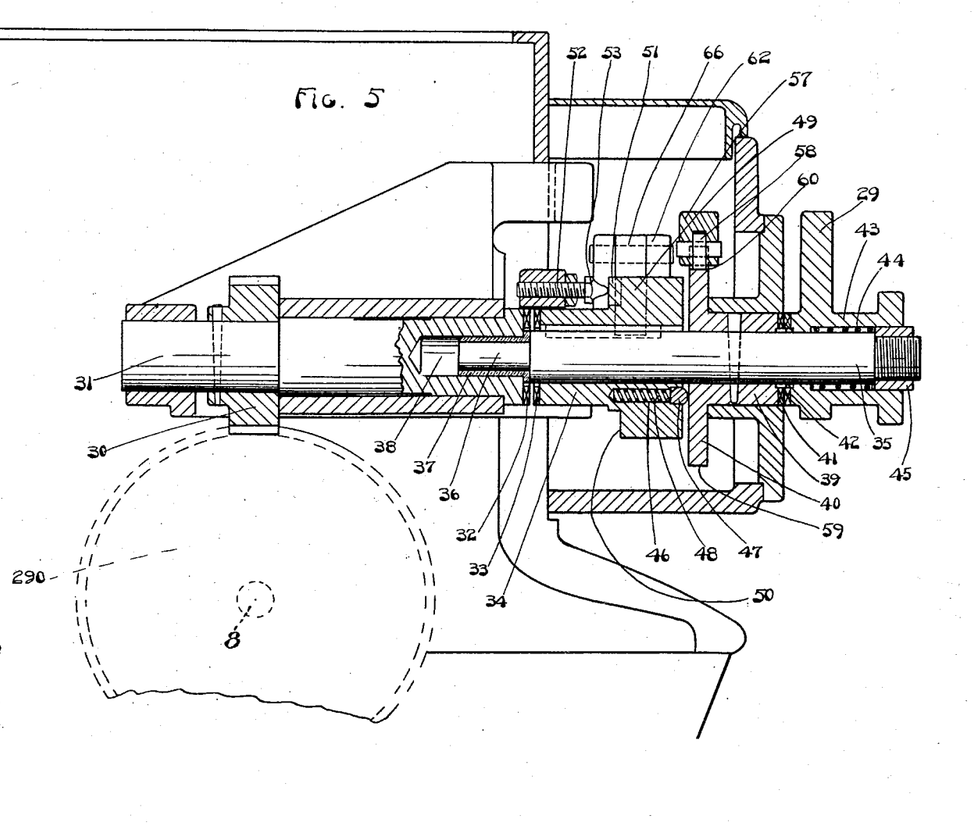
Fig. 5 is a sectional view on line 5—5 of Fig. 3.
Figures 6, 7:
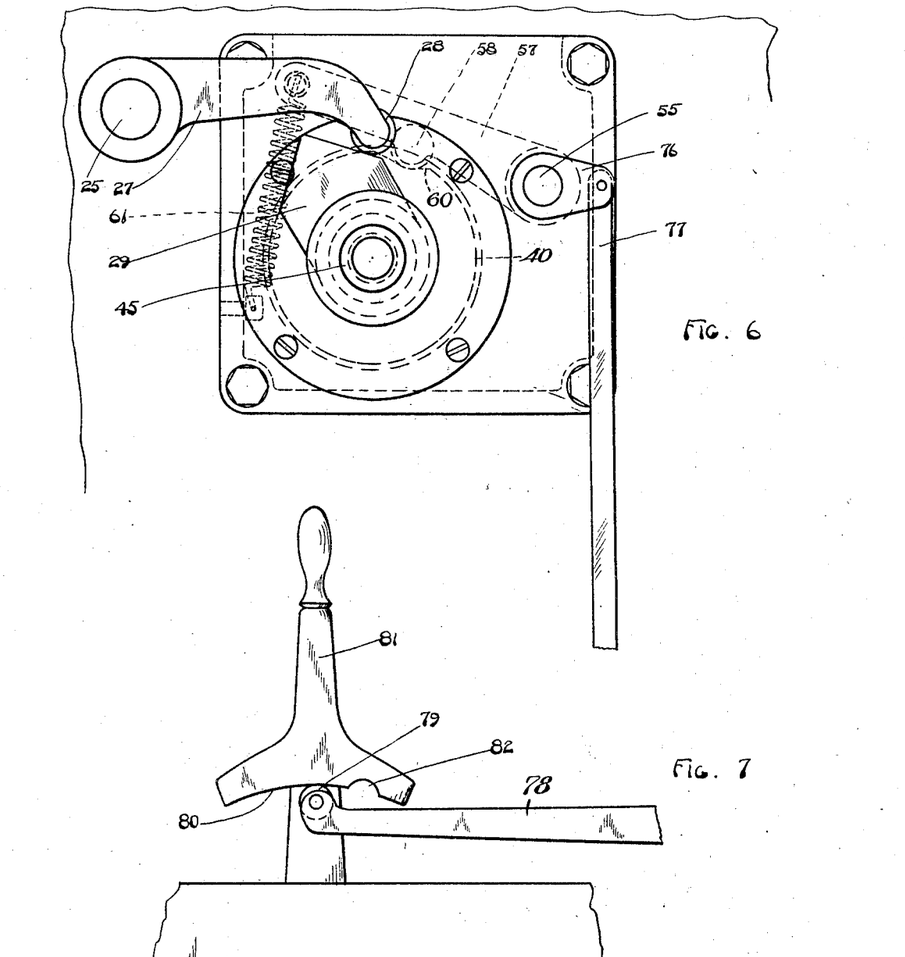
Fig. 6 is an enlarged elevation of parts shown in Fig. 1.
Fig. 7 is a rear view of an actuating lever forming a detail of my invention.

The pulley 9 is driven from any suitable source and is revolubly mounted upon a bushing 12 within which is revolubly contained the tubular drive shaft 13. A reciprocating bar 14 is contained within the tube shaft and is adapted to operate upon a lever 15 fulcrumed upon a friction plate 16 secured to the tube shaft, and having a pivotal mounting upon a friction collar 17 splined upon the tube shaft, adapted to revolve with the tube shaft and capable of reciprocation longitudinally of the tube shaft. Suitable friction rings 18 contained between the friction collar and friction plate are carried by the pulley and move with the pulley. When the friction collar is moved toward the friction plate, the friction rings 18 are clamped between the friction collar and friction plate thereby transmitting motion between the friction collar and tube shaft. The tubular drive shaft 13 carries a gear 19 that meshes with the gear 20 carried by the driven shaft or spindle 8, of the spindle structure. The tube shaft 13 has formed in it a slot extending longitudinally of itself, and through which slot a pin 22 carried by the inner end of the bar 14 extends. The shaft 13 carries a collar 23 to which the pin 22 is attached, and the collar 23 is engaged by a fork 24 mounted on the transversely extending shaft 25 carried by the lathe head 26. When the bar 14 is attached to the left, see Fig. 2, the friction collar and friction plate are brought into driving engagement, and when the bar 14 is moved to the right the clutch structure 10 is disconnected from the shaft 13. The forward end of the shaft 25 carries a roller arm 27, the roller 28 of which is adapted to engage a lug 29, see Fig. 1, the purpose of which will be explained hereafter. The spindle 8 carries a gear 290 in mesh with the gear 30 carried by the shaft 31. The forward end of the shaft 31 has formed on it a clutch element 32 that may engage a complementary clutch element 33 formed on the sleeve 34. The sleeve 34 is splined to shaft 35 carried by the lathe head and having a rear end bearing 36 in a bushing 37 lodged within the axial bore 38 formed in the forward end of the shaft 31. The shaft 35 has keyed to it a sleeve 39. The rear end of the sleeve 39 carries an annular flange 40 and the forward end of the sleeve carries a clutch member 41 adapted to be engaged by a complementary clutch member 42 carried by the rear end of a collar 43 mounted on the shaft 35. The collar 43 may be actuated longitudinally of the shaft 35, and a spring 44 extending about the shaft 35 and having its rear end in abutment upon the collar 43 and its forward end in engagement upon a nut 45 mounted on the shaft 35, yieldingly retains the clutch member 42 in engagement upon the clutch member 41. The collar 43 carries the lug 29 previously referred to and adapted to engage the roller on the roller arm 27. The sleeve 34 has formed in it a bore 46 within which is contained a pin 47 and a spring 48, the spring yieldingly retaining the pin in engagement upon the flange 40 and yieldingly resisting separation of the clutch members 32 and 33. The sleeve 34 has formed in its forward end a disc like cam 49 from the rear face 50 of which projects a lug 51. A sleeve 54 revolubly mounted on the shaft 55 carries an arm 56. The arm 56 carries an adjustable screw 52, the head 53 of which engages the face 50 of the cam 49. A roller arm 57 is revolubly mounted on shaft 55 and carries a roller 58 intermediate its ends. The roller 58 engages the periphery 59 of the flange or disc 40, and is adapted to lodge in a notch 60 formed in the outer edge of the disc 40. A spring 61 yieldingly retains the roller 58 in engagement upon the disc 40.

The function of the roller arm and the spring is to move the shaft 35 a slight distance at about the time when the head 53 of the screw 52 reaches the apex of the lug 51 thereby separating the clutch elements 32 and 33 so as to preclude any contact of one such element upon the other. The notch or depression 60 is so related to the lug 51 that the roller 58 is positioned at the outer edge of the notch 60 at the time when the head 53 of the screw 52 reaches approximately the apex of the lug 51 whereupon the spring 61 moves the roller 58 into the bottom of the notch 60, thereby rotatably actuating the disc 40 and lodging the apex of the lug 51 immediately in line with the head 53 of the screw 52, as shown in Fig. 5. It should be noted that the arm 57, roller 58, mutilated disc 40 and spring 61 comprise a means for augmenting the separation of the clutches 32 and 33. The sleeve 54 carries a bifurcated bracket 62 between the branches 63 and 64 of which is carried a pin 65 pivotally supporting a bell crank lever 66. The one arm 67 of the lever 66 carries a lug 68 adapted to lodge in a notch 69 formed in the periphery of the shaft 55. The face 70 of the notch 69 forms a shoulder for engagement upon the shoulder 71 of the lug 68. The second arm 72 of the bell crank lever is adapted to assume a position adjacent the periphery of the cam 49 and to be engaged by a lug 73 carried by the cam and extending beyond the periphery of the cam. The engagement of the lug 73 upon the lever arm 72 serves to move the other arm of the bell crank lever out of engagement with the shaft 55 against the yielding resistance of the spring 74 that normally retains the arm 67 in engagement upon the shaft 55, thereby releasing the sleeve 54 from the shaft 55. Normally, the engagement of the shoulder on the bell crank lever 66 with the shoulder on the shaft 55, serves to fix the sleeve upon the shaft for movement therewith. The forward end of the shaft 55 extends from the housing or casing 75 of the lathe head stock and carries a crank 76. A link 77 has its upper end pivotally mounted upon the crank and has its lower end pivotally mounted upon one end of a lever 78 pivotally mounted upon the housing 75. The other end of the lever 78 carries a roller 79 and engages a face 80 on the trip lever 81, and is adapted to lodge in a notch or recess 82 formed in the face 80 of the trip lever 81. The trip lever is adapted to control the feed of the cutting tools as is common in the art. It is not essential that a trip lever having the stated attachment be employed for actuating the shaft 55, any other suitable actuating mechanisms may be employed if desired.

Figure 4:
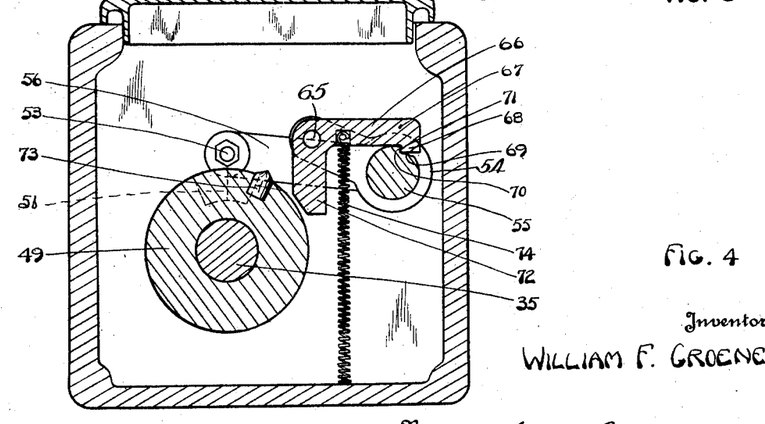
Fig. 4 is a sectional view on line 4—4 of Fig. 3.

The operation of my device is as follows:

The device shown herein is ordinarily used as a sub-combination with other devices for automatic control of machine tools and the like, for example as shown in my co-pending application, Serial No. 719,906, filed June 13, 1924, the device is capable of use on individual lathes, a plurality of which lathes would be under the care of one operator. The tools would perform their work as is common, the spindle continuing to revolve. The operator would make the rounds of lathes and on reaching a lathe the work of which had been completed, except for touching up thereof, would actuate the lever 81 whereby to bring into operation the device disclosed herein. During the time that the device is in operation the operator would touch up or finish the work. More specifically, the device would be operated in the following manner. Assuming that motion is being transmitted from the pulley 9 to the drive shaft 13, the spindle 8 is actuated through gears 19 and 20. If it is desired to permit the spindle to rotate for a determinable period, and to then stop the spindle, trip lever 81 would be moved to the right about its pivotal mounting until the notch 82 formed in the lever 81 is in alignment with the roller 79 carried by the lever 78. Whereupon the spring 83 secured to one end of the lever 78, would actuate the said lever 78 in a counter clockwise direction about its pivotal mounting thereby vertically reciprocating the link 77. This vertical reciprocation of the link 77 rotates the shaft 55 whereby to project the head 53 of the screw 52 outwardly beyond the cam 49 whereupon the spring 48 would bring the clutch members 32 and 33 into driving engagement. It should be borne in mind that the shaft 31 is moving at all times when the gear 20 is moving, because of the driving connection through the spiral gears 290 and 30. Rotation of cam 49, which is in a clockwise direction as seen in Fig. 4, brings lug 73 into contact with arm 72 of bell crank lever 66 disengaging the bell crank lever and shaft 55 thereby permitting sleeve 54 to move independent of shaft 55 and permitting screw head 53 of screw 52 to fall into position for engagement with lug 51 on cam 49 so that when cam 49 makes one revolution lug 51 acting on screw head 53, again separates clutch 32 and 33. The spring 74 yieldingly resists disengagement of screw head 53 and cam 49. The engagement of the screw head 53 upon the lug 51 in combination with the roller arm and the disc 40 serves to disengage the clutch elements 32 and 33 as previously explained. In the meantime the lug 29 carried by the collar 43 is brought into engagement with the roller 28 carried by the shaft 25, and the shaft 25 is rotatably actuated to such extent as is necessary to move the reciprocating bar 14 longitudinally of itself thereby disengaging the clutch elements whereby motion is transmitted from the pulley 9 to the drive shaft 13. The lug 29 may be moved to various adjusted positions so as to effect stopping of the spindle after determinable intervals by moving the hand manipulated collar 43 against the yielding resistance of the spring 44 and bringing various sections of the clutch elements to engagement with various other sections of the clutch element 41 carried by the sleeve 39 keyed to the shaft 35.

It should be noted that the adjustable screw 52, the arm 56, and the shaft 55 comprise a cam follower, the action of which is employed to control the interengagement of the complementary clutch members on the shafts 31 and 35.

What I claim is:

1. In a device of the class described, the combination of a shaft, drive means for imparting motion to the shaft, a clutch controlling transmission of motion from the drive means to the shaft, and normally non-operating means for operation from the shaft for actuating the clutch whereby to render the drive means inoperative upon the shaft, said normally non-operating means including a means for returning the same to its normal position upon operation of the clutch.

2. In a device of the class described, the combination of a shaft, drive means for imparting motion to the shaft, a clutch controlling transmission of motion from the drive means to the shaft, a spindle driven from the shaft, and normally non-operating means for operation from the spindle for actuating the clutch whereby it renders the drive means inoperative upon the shaft, said normally non-operating means including means for automatically returning the same to its normal position upon operation of the clutch.

3. In a device of the class described the combination of a drive means, a shaft, a clutch controlling transmission of power from the drive means to the shaft, means for actuating the clutch whereby to render the drive means inoperative upon the shaft, a second shaft driven from the first shaft, a cam, complementary clutch members carried by the cam and second mentioned shaft, means associated with the cam for controlling the clutch actuating means, and means controlling the inter-engagement of the clutch elements associated with the cam and second mentioned shaft.

4. In a device of the class described the combination of driving means, a shaft, a clutch controlling transmission of power from the drive means to the shaft, means for actuating the clutch whereby to render the drive means inoperative upon the shaft, a second shaft actuated by the first mentioned shaft, a third shaft actuated from the second shaft and carrying a clutch element, a cam carrying a complementary clutch element for engagement with the clutch element carried by the third shaft, and means associated with the cam for actuating the means for actuating the clutch controlling transmission of power from the drive means to the first mentioned shaft.

5. In a device of the class described the combination of a drive means, a drive shaft, a clutch for transmitting power from the drive means to the drive shaft, means for actuating the clutch whereby to render the drive means inoperative upon the drive shaft, a shaft operable from the drive shaft carrying a clutch member, a complementary clutch member for engagement with the first mentioned clutch member, a cam and cam follower co-operatively controlling inter-engagement of the complementary clutch elements, and means associated with the second mentioned clutch element controlling the means for actuating the clutch for transmitting power from the drive means to the drive shaft.

6. In a device of the class described the combination of a revoluble shaft, drive means for imparting rotatory motion to the revoluble shaft, a drive clutch controlling transmission of power from the drive means to the revoluble shaft, a clutch element carried by the revoluble shaft, and a second clutch element for movement with the first mentioned clutch element and mounted for disengagement from the first mentioned clutch element, means yieldingly resisting disengagement of the complementary clutch elements, means for utilizing the joint movement of the complementary clutch elements for disengaging said clutch elements, and means operable from the second mentioned clutch element for actuating the drive clutch whereby to render the drive means inoperative upon the revoluble shaft.

7. In a device of the class described the combination of a revoluble shaft, drive means for imparting rotatory motion to the revoluble shaft, a drive clutch controlling transmission of power from the drive means to the revoluble shaft, a clutch element carried by the revoluble shaft, and a second clutch element for movement with the first mentioned clutch element and mounted for disengagement from the first mentioned clutch element, means yieldingly resisting disengagement of the complementary clutch elements, means for utilizing the joint movement of the complementary clutch elements for disengaging said clutch elements, means for augmenting the action of the clutch element disengaging means whereby to space the complementary clutch elements for precluding contact of such elements one upon the other, and means operable from the second mentioned clutch element for actuating the drive clutch whereby to render the drive means inoperative upon the revoluble shaft.

8. In a device of the class described the combination of a drive means, a revoluble shaft, a drive clutch for controlling transmission of power from the drive means to the revoluble shaft, a second shaft co-axial with the first shaft and mounted for movement independent of the first shaft, the shafts carrying complementary clutch members for movement with the respective shafts and for inter-engagement whereby to move the shafts in unison, the clutch member associated with the second shaft being mounted for reciprocation longitudinally of the second shaft, means yieldingly resisting disengagement of the last referred to clutch member from the clutch member associated with the first mentioned shaft, a cam associated with the reciprocating clutch member, a cam follower for engagement upon the cam, and for moving the cam against the action of the yielding means whereby to disengage the clutch members, a lever for actuating the drive clutch whereby to render the drive means inoperative upon the first mentioned shaft, and trip mechanism associated with the second mentioned shaft for actuating the lever.

9. In a device of the class described the combination of a drive means, a revoluble shaft, a drive clutch for controlling transmission of power from the drive means to the revoluble shaft, a second shaft co-axial with the first shaft and mounted for movement independent of the first shaft, the shafts carrying complementary clutch members for movement with the respective shafts and for inter-engagement whereby to move the shafts in unison, the clutch member associated with the second shaft being mounted for reciprocation longitudinally of the second shaft, means yieldingly resisting disengagement of the last referred to clutch member from the clutch member associated with the first mentioned shaft, a cam associated with the reciprocating clutch member, a cam follower for engagement upon the cam, and for moving the cam against the action of the yielding means whereby to disengage the clutch members, a lever for actuating the drive clutch whereby to render the drive means inoperative upon the first mentioned shaft, trip mechanism associated with the second mentioned shaft for actuating the lever, and means for augmenting the action of the cam follower upon the cam for moving the cam against the yielding means.

10. In a device of the class described the combination of a drive means, a revoluble shaft, a drive clutch for controlling transmission of power from the drive means to the revoluble shaft, a second shaft co-axial with the first shaft and mounted for movement independent of the first shaft, the shafts carrying complementary clutch members for movement with the respective shafts and for inter-engagement whereby to move the shafts in unison, the clutch member associated with the second shaft being mounted for reciprocation longitudinally of the second shaft, means yieldingly resisting disengagement of the last referred to clutch member from the clutch member associated with the first mentioned shaft, a cam associated with the reciprocating clutch member, a cam follower for engagement upon the cam, and for moving the cam against the action of the yielding means whereby to disengage the clutch members, a lever for actuating the drive clutch whereby to render the drive means inoperative upon the first mentioned shaft, and a trip mechanism carried by the second mentioned shaft and mounted for rotatory adjustment upon the second mentioned shaft and for actuating the lever.

11. In a device of the class described the combination of a drive means, a revoluble shaft, a drive clutch for controlling transmission of power from the drive means to the revoluble shaft, a second shaft co-axial with the first shaft and mounted for movement independent of the first shaft, the shafts carrying complementary clutch members for movement with the respective shafts and for inter-engagement whereby to move the shafts in unison, the clutch member associated with the second shaft being mounted for reciprocation longitudinally of the second shaft, means yieldingly resisting disengagement of the last referred to clutch member from the clutch member associated with the first mentioned shaft, a cam associated with the reciprocating clutch member, a cam follower for engagement upon the cam, and for moving the cam against the action of the yielding means whereby to disengage the clutch members, a lever for actuating the drive clutch whereby to render the drive means inoperative upon the first mentioned shaft, a trip mechanism carried by the second mentioned shaft and mounted for rotatory adjustment upon the second mentioned shaft and for actuating the lever, and means for augmenting the action of the cam follower upon the cam for moving the cam against the yielding means.

12. In a device of the class described the combination of a drive means, a revoluble shaft, a drive clutch for controlling transmission of power from the drive means to the revoluble shaft, a lever for actuating the drive clutch whereby to render the drive means inoperative upon the revoluble shaft, a second shaft mounted co-axially with the revoluble shaft and capable of movement independent of the first shaft, complementary clutch members carried by the shafts whereby to transmit motion from the first shaft to the second shaft, the clutch associated with the second shaft being mounted for rotation with and reciprocation longitudinally of a second shaft, a cam associated with the last mentioned clutch member, means yieldingly resisting disengagement of the complementary clutch members, a cam follower for disengaging the complementary clutch members, means for disassociating the cam and cam follower, means for yieldingly retaining the cam follower out of engagement upon the cam until the complementary clutch members have been moved into engagement, a sleeve mounted on the second shaft for rotation therewith, the sleeve having a notched annular flange, a pivotally mounted roller arm, a roller carried by the roller arm for engagement upon the annular flange adapted to lodge in the notch in the flange, means yieldingly retaining the roller in engagement upon the flange whereby the roller may be caused to enter into the notch in the annular flange and the flange be rotatably actuated under the influence of the yielding means associated with the roller arm, and a trip mechanism associated with the second mentioned shaft for actuating the lever.

13. In a device of the class described the combination of a drive means, a revoluble shaft, a drive clutch for controlling transmission of power from the drive means to the revoluble shaft, a lever for actuating the drive clutch whereby to render the drive means inoperative upon the revoluble shaft, a second shaft mounted co-axially with the revoluble shaft and capable of movement independent of the first shaft, complementary clutch members carried by the shafts whereby to transmit motion from the first shaft to the second shaft, the clutch associated with the second shaft being mounted for rotation with and reciprocation longitudinally of a second shaft, a cam associated with the last mentioned clutch member, means yieldingly resisting disengagement of the complementary clutch members, a cam follower for disengaging the complementary clutch members means for disassociating the cam and cam follower, means for yieldingly retaining the cam follower out of engagement upon the cam until the complementary clutch members have been moved into engagement, a sleeve mounted on the second shaft for rotation therewith, the sleeve having a notched annular flange, a pivotally mounted roller arm, a roller carried by the roller arm for engagement upon the annular flange adapted to lodge in the notch in the flange, means yieldingly retaining the roller in engagement upon the flange whereby the roller may be caused to enter into the notch in the annular flange and the flange be rotatably actuated under the influence of the yielding means associated with the roller arm, and a trip mechanism associated with the second mentioned shaft mounted for rotatory adjustment upon the second mentioned shaft and for actuating the lever.

14. In a device of the class described the combination of a shaft, a second shaft, engageable means for transmitting power from the first shaft to the second shaft, a third shaft, means carried by the third shaft and capable of independent movement thereon for controlling engagement of the engageable means, and means for locking the control means to the third shaft so that said third shaft may be moved to carry the control means to such a position as to be inoperative on the engageable means.

15. In a device of the class described the combination of a shaft, a second shaft, engageable means for transmitting power from the first shaft to the second shaft, a third shaft, control means carried by the third shaft and capable of independent movement thereon and adapted to control engagement of the engageable means, means carried by the control means for locking said control means to the third shaft whereby said control means may be moved with the third shaft for rendering the control means inoperative on the engageable means, and means yieldingly retaining the control means normally operative on the engageable means.

16. The combination with a drive shaft and a driven shaft of means normally operative for transmitting power from the drive shaft to the driven shaft, means including separable clutch members operable from the driven shaft for automatically rendering the power transmitting means inoperative, and means for operation after the second mentioned means has operated for augmenting the separating movement of the clutch members.

17. In a device of the class described the combination of a shaft, a second shaft, engageable means for transmitting power from the first shaft to the second shaft, a third shaft, control means mounted on the third shaft controlling engagement of the engageable means and adapted for movement independent of the third shaft, locking means carried by the control means on the third shaft for locking same upon the third shaft whereby the control means may be moved with the third shaft for rendering said control means inoperative on the engageable means, and means carried by one of the engageable means for releasing the means carried by the third shaft.

In testimony whereof, I have hereunto subscribed my name this 21st day of March, 1923.

WILLIAM F. GROENE.